US 11,542,009 B2

(12) United States Patent
Truemper et al.

(10) Patent No.: US 11,542,009 B2
(45) Date of Patent: Jan. 3, 2023

(54) COOLING ARRANGEMENT FOR A KITCHEN, AND KITCHEN

(71) Applicant: Airbus Operations GmbH, Hamburg (DE)

(72) Inventors: Torsten Truemper, Hamburg (DE); Ekkehard Lohse, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 84 days.

(21) Appl. No.: 16/189,341

(22) Filed: Nov. 13, 2018

(65) Prior Publication Data

US 2019/0144118 A1    May 16, 2019

(30) Foreign Application Priority Data

Nov. 14, 2017   (DE) .................... 10 2017 126 693.3

(51) Int. Cl.
  *B64D 11/04*    (2006.01)
  *B64D 13/06*    (2006.01)

(52) U.S. Cl.
  CPC .............. *B64D 11/04* (2013.01); *B64D 13/06* (2013.01); *B64D 2013/0629* (2013.01)

(58) Field of Classification Search
  CPC .................. B64D 11/04; B64D 13/06; B64D 2013/0629; B64D 11/0007; F25B 2339/047; F25B 2600/2511; Y02T 50/46; Y02T 50/56; F28F 27/00
  See application file for complete search history.

(56) References Cited

U.S. PATENT DOCUMENTS

| 4,361,014 | A  |   | 11/1982 | Blain |
| 5,363,671 | A  | * | 11/1994 | Forsythe ................... F25B 5/02 62/390 |
| 5,491,979 | A  | * | 2/1996  | Kull ........................ F25D 15/00 62/239 |
| 7,231,778 | B2 | * | 6/2007  | Rigney .............. B60H 1/32281 62/434 |
| 7,780,114 | B2 |   | 8/2010  | Doebertin et al. |
| 9,062,909 | B2 |   | 6/2015  | Lu et al. |

(Continued)

FOREIGN PATENT DOCUMENTS

| DE | 32 09 492 A1 | 10/1982 |
| DE | 43 40 316 A1 | 6/1995 |

(Continued)

OTHER PUBLICATIONS

German Search Report; priority document.

*Primary Examiner* — Frantz F Jules
*Assistant Examiner* — Martha Tadesse
(74) *Attorney, Agent, or Firm* — Greer, Burns & Crain, Ltd.

(57) ABSTRACT

A cooling arrangement for a kitchen provided for installation in a means of transport comprises a cooling circuit which can have a cooling medium flowing through it and in which a condenser and an evaporator are arranged. The condenser is accommodated in a condenser housing and is arranged in a first installation space which is intended to form a first sub-region of the kitchen. The evaporator is accommodated in an evaporator housing formed separately from the condenser housing, and is arranged in a second installation space which is intended to form a second sub-region of the kitchen.

13 Claims, 1 Drawing Sheet

(56) References Cited

U.S. PATENT DOCUMENTS

| | | | |
|---|---|---|---|
| 9,487,299 B2 | 11/2016 | Oswald et al. | |
| 9,676,483 B2 | 6/2017 | Godecker et al. | |
| 10,252,804 B2* | 4/2019 | Schalla | B64D 11/0007 |
| 10,492,603 B2* | 12/2019 | Garcia | B64D 11/0007 |
| 2008/0156030 A1* | 7/2008 | Cur | F25D 11/027 |
| | | | 62/441 |
| 2010/0224726 A1* | 9/2010 | Lu | F25D 17/06 |
| | | | 62/507 |
| 2013/0047657 A1* | 2/2013 | Oswald | B64D 11/04 |
| | | | 29/402.01 |
| 2014/0008037 A1* | 1/2014 | Trumper | B64D 13/00 |
| | | | 165/96 |
| 2015/0089968 A1* | 4/2015 | Lu | B64D 11/04 |
| | | | 62/333 |
| 2015/0266353 A1* | 9/2015 | Lu | B64D 13/08 |
| | | | 62/506 |
| 2016/0340044 A1* | 11/2016 | Schalla | F28F 27/00 |
| 2017/0122647 A1* | 5/2017 | Burd | B64D 13/08 |
| 2018/0086469 A1 | 3/2018 | Truemper | |

FOREIGN PATENT DOCUMENTS

| | | |
|---|---|---|
| DE | 10 2006 023 047 B4 | 11/2007 |
| DE | 10 2015 210 268 A1 | 12/2016 |
| WO | 2005094346 A2 | 10/2005 |
| WO | 2010101972 A1 | 9/2010 |
| WO | 2013033439 A1 | 3/2013 |
| WO | 2015003073 A1 | 1/2015 |
| WO | 2016193378 A1 | 12/2016 |

* cited by examiner

US 11,542,009 B2

COOLING ARRANGEMENT FOR A KITCHEN, AND KITCHEN

CROSS-REFERENCES TO RELATED APPLICATIONS

This application claims the benefit of the German patent application No. 10 2017 126 693.3 filed on Nov. 14, 2017, the entire disclosures of which are incorporated herein by way of reference.

BACKGROUND OF THE INVENTION

The invention relates to a cooling arrangement for a kitchen provided for installation in a means of transport, in particular an aircraft, and to a kitchen equipped with such a cooling arrangement.

Modern passenger aircraft are usually equipped with kitchens, so-called galleys which are known, for example, from DE 10 2006 023 047 B4 and/or from U.S. Pat. No. 7,780,114 B2. The galleys are usually installed in the door-entry regions of the aircraft cabin and have a basic structure containing a substructure which is delimited by a work top, and upper compartments which are arranged above the work top. It is usually kitchen equipment, e.g., coffee machines, kettles, ovens, etc., and beverages and food which are accommodated in the upper compartments of the galley. In contrast, a trolley compartment for accommodating mobile trolleys which are loaded with items, e.g., beverages and food, intended to be given out to the passengers on board the aircraft is provided in the substructure of the galley.

DE 10 2015 210 268 A1 and WO 2016/193378 A1 disclose a cooling system which comprises a cooling arrangement which is installed in the region of a side wall of a kitchen or is integrated in a side wall of the kitchen. As an alternative, the cooling arrangement is installed in the region of an intermediate wall, or is integrated in an intermediate wall which subdivides a substructure of the kitchen into a first portion and a second portion. Cooling-arrangement fluid lines, by means of which cooling-arrangement heat exchangers which have a cooling medium flowing through them, are coupled thermally to a respective fluid can comprise portions which are integrated in a work top of the kitchen. The cooling arrangement generates a cooled fluid, for example air which is directed, through an outlet, into a region in the vicinity of the floor of a substructure of the kitchen and, via a fluid inlet formed in an underside of the work top, is recirculated from the substructure into the cooling apparatus.

In the case of the cooling arrangement described in DE 10 2015 210 268 A1 and WO 2016/193378 A1, all the essential functional components of the cooling arrangement, i.e., a cooling circuit, an evaporator, a compressor, a condenser and electronic components for controlling the operation of the cooling arrangement, are arranged in a common housing. This fully integrated architecture of the cooling arrangement makes it possible to dispense with mechanical interfaces between the components of the cooling arrangement. However, the cooling arrangement requires a comparatively large amount of installation space.

SUMMARY OF THE INVENTION

An object of the invention is to provide a flexible-usage cooling arrangement which is intended for a kitchen provided for installation in a means of transport and which is optimized in terms of installation space. The invention is also directed to an object of specifying a kitchen equipped with such a cooling arrangement.

A cooling arrangement for a kitchen provided for installation in a means of transport comprises a cooling circuit which can have a cooling medium, for example a two-phase refrigerant, flowing through it. A condenser and an evaporator are arranged in the cooling circuit. As it flows through the evaporator, the cooling medium flowing through the cooling circuit absorbs heat from a fluid which is to be cooled, and the cooling medium is transferred in the process from the liquid into the gaseous state. In contrast, as it flows through the condenser, the cooling medium flowing through the cooling circuit is cooled by virtue of heat energy being dissipated to a heat-absorbing fluid, and is converted back again from the gaseous into the liquid state.

The evaporator can comprise a heat exchanger, by means of which the cooling medium flowing through the cooling circuit is brought into thermal contact with the fluid which is to be cooled. The fluid which is to be cooled can be a liquid or a gas, in particular, air. Similarly, it is also possible for the condenser to comprise a heat exchanger, by means of which the cooling medium flowing through the cooling circuit is brought into thermal contact with the heat-absorbing fluid. The heat-absorbing fluid, in a manner similar to the fluid which is to be cooled, can be a liquid or a gas, in particular, air.

The condenser is accommodated in a condenser housing separately from the evaporator and is arranged in a first installation space which is intended to form a first sub-region of the kitchen. The evaporator is accommodated separately from the condenser in an evaporator housing, formed separately from the condenser housing, and is arranged in a second installation space which is intended to form a second sub-region of the kitchen. The second installation space which serves for the installation of the evaporator, is preferably intended to form a sub-region of the kitchen which is arranged in the immediate vicinity of a device which is to be cooled. In contrast, it is possible for the first installation space to form any desired sub-region of the kitchen, i.e., also a sub-region which is spatially separate from a device which is to be cooled.

Separating the cooling arrangement into a "condenser unit" and a separate "evaporator unit" creates two separate units which each require a smaller amount of installation space than the cooling arrangement as a whole, and can be installed at spatially separate positions in the kitchen. This allows optimum utilization of the limited amount of installation space present in such a kitchen. Furthermore, the cooling arrangement can be used in a particularly flexible manner, since, depending on requirements, the second installation space which accommodates the evaporator, can form different sub-regions of the kitchen. In particular, it is possible for the evaporator to be installed in a position adjacent to a kitchen device which is to be cooled, whereas the condenser can occupy an installation space elsewhere in the kitchen.

In a preferred embodiment, the cooling arrangement also comprises a compressor which is arranged in the cooling circuit of the cooling arrangement. The compressor is preferably positioned in the cooling circuit upstream of the condenser. The term "upstream" refers here to the direction in which the cooling medium flows through the cooling circuit.

Furthermore, the cooling arrangement can comprise a first delivery device which is intended to deliver through the condenser a first fluid which is intended to absorb heat from the cooling medium flowing through the condenser. As already mentioned, the first fluid can be a liquid or a gas. The use of a first liquid fluid is advantageous, for example, when the cooling arrangement is to be integrated in a higher-level heat-management system. Accordingly, depending on requirements, the first delivery device can be designed in the form of a pump or in the form of a fan.

The cooling arrangement can also comprise a second delivery device which is intended to deliver through the evaporator a second fluid which is intended to dissipate heat to the cooling medium flowing through the evaporator. In a manner similar to the first fluid, it is also possible for the second fluid to be a liquid or a gas, and it is therefore also possible, depending on requirements, for the second delivery device to be designed in the form of a pump or in the form of a fan.

Furthermore, the cooling arrangement can comprise a valve which is intended to control a volume flow of the cooling medium through the cooling circuit of the cooling arrangement. The valve can be designed, for example, in the form of an expansion valve. Appropriate control of the valve makes it possible to control the feed of cooling medium to the evaporator, and thus the cooling capacity of the evaporator, as desired.

In a preferred embodiment of the cooling arrangement, the compressor is arranged in the condenser housing. In addition, or as an alternative, it is also possible for the first delivery device to be arranged in the condenser housing. The second delivery device can be arranged in the evaporator housing. It is also possible for the valve which is designed, in particular, in the form of an expansion valve and is intended for controlling the volume flow of the cooling medium through the cooling circuit of the cooling arrangement, to be arranged in the evaporator housing. The cooling arrangement is, then, subdivided de facto into two separate, and separately installable, units, in which respectively functionally linked elements of the cooling arrangement are combined.

The cooling arrangement can comprise a plurality of evaporators which are arranged in the cooling circuit of the cooling arrangement. These evaporators can serve, for example, to absorb heat from various kitchen devices which are to be cooled, and to discharge this heat. The evaporators can be correspondingly dimensioned and optimized for this purpose. The evaporators are arranged in the second installation space preferably in each case separately from the condenser. Each evaporator is preferably assigned a valve which is intended to control a volume flow of the cooling medium to the evaporator and thus the cooling capacity of the evaporator. The valves assigned to the individual evaporators are designed preferably in the form of expansion valves.

It is conceivable, in principle, for the evaporators of the cooling arrangement to be arranged in a common evaporator housing. It is preferable, however, for each evaporator of the cooling arrangement to be accommodated in a separate evaporator housing. The valve assigned to the evaporator can also be integrated in said evaporator housing. It is also the case that the cooling-arrangement evaporators accommodated either in a common evaporator housing or in separate evaporator housings can be arranged in a common second installation space. However, the second installation space is preferably subdivided into a plurality of second installation sub-spaces which are each formed separately from one another and are suitable for accommodating at least one evaporator, preferably at least one evaporator accommodated in a separate evaporator housing.

The second installation sub-spaces are preferably intended to form spatially separate sub-regions of the kitchen. The cooling arrangement can then advantageously be used to cool heat-generating devices present in various regions of the kitchen, it being possible to dispense with the assignment of an entire cooling arrangement to each heat-generating device. Rather, all that is necessary is for the cooling arrangement to be provided with as many evaporators as is necessary to ensure sufficient cooling of all the heat-generating devices.

In a preferred embodiment, the cooling arrangement also comprises a control unit for controlling the operation of the cooling arrangement. The control unit is arranged preferably in the condenser housing. It is thus possible for the control unit to be separated spatially from a device which is to be cooled by the evaporator of the cooling arrangement, and thus to be protected against the heat generated by the device which is to be cooled.

The control unit of a cooling arrangement having a plurality of evaporators is preferably intended to control cooling capacities of the evaporators independently of one another. For example, the control unit can be intended to control valves assigned to the individual evaporators and thus the cooling-medium volume flow fed to the evaporators. In the case of a cooling arrangement configured in this way, it is possible to define different target temperatures for the different devices which are to be cooled. It is also possible to react to different cooling requirements of the devices which are to be cooled.

At least one cooling-circuit connection, by means of which the condenser accommodated in the condenser housing is connected to the cooling circuit of the cooling arrangement, can be provided in the region of an outer surface of the condenser housing. It is preferable to provide a condenser feed-line connection, by means of which the cooling medium heated as it flows through the evaporator is fed to the condenser, and a condenser discharging-line connection, by means of which the cooling medium cooled as it flows through the condenser is discharged from the condenser. The outer surface of the condenser housing can be, for example, a rear outer surface of the condenser.

In addition, or as an alternative, an electrical connection, by means of which the control unit accommodated in the condenser housing is connected to an electrical network, can be arranged in the region of an outer surface of the condenser housing. The electrical connection preferably establishes a connection between the control unit and an electrical supply network. It is also possible for the control unit to be fed signals, for example signals which are characteristic of the operating state of the cooling arrangement and/or of a device which is to be cooled, via the electrical connection. Furthermore, control signals can be emitted to the control unit via the electrical connection.

A kitchen comprises a cooling arrangement described above.

In a preferred embodiment of the kitchen, the first installation space of the cooling arrangement forms a region of a kitchen compartment arranged above a work top of the kitchen. In particular, the first installation space forms a rear region of the kitchen compartment arranged above the work top of the kitchen. The kitchen compartment is preferably a standard, non-cooled kitchen compartment.

It is also possible for the kitchen to comprise a trolley compartment which is to be cooled and is arranged beneath the work top of the kitchen. The second installation space or an installation sub-space of the second installation space of the cooling arrangement, in which is arranged an evaporator housing with an evaporator accommodated therein, can be arranged in a position adjacent to the trolley compartment or integrated in the trolley compartment. Trolleys accommodated in the trolley compartment and laden with food to be cooled can then be cooled by means of the evaporator, for example, in accordance with the air-through principle and/or the air-over principle.

In addition, or as an alternative, the kitchen can comprise a kitchen compartment which is to be cooled and is arranged above the work top of the kitchen. The second installation space or an installation sub-space of the second installation space of the cooling arrangement, in which is arranged an evaporator housing with an evaporator accommodated therein, can be arranged in a position adjacent to the kitchen compartment or integrated in the kitchen compartment. The kitchen compartment which is to be cooled can be, for example, a wine cooler or a compartment provided for accommodating food which is to be cooled. The kitchen compartment which is to be cooled can be fed air which is cooled, for example, by the evaporator and is delivered through the evaporator by means of the second delivery device. This even provides for effective cooling of kitchen compartments with no door.

BRIEF DESCRIPTION OF THE DRAWINGS

A preferred embodiment of the invention will now be explained in more detail with reference to the accompanying schematic drawings, in which.

DETAILED DESCRIPTION OF THE PREFERRED EMBODIMENTS

Figure 1:
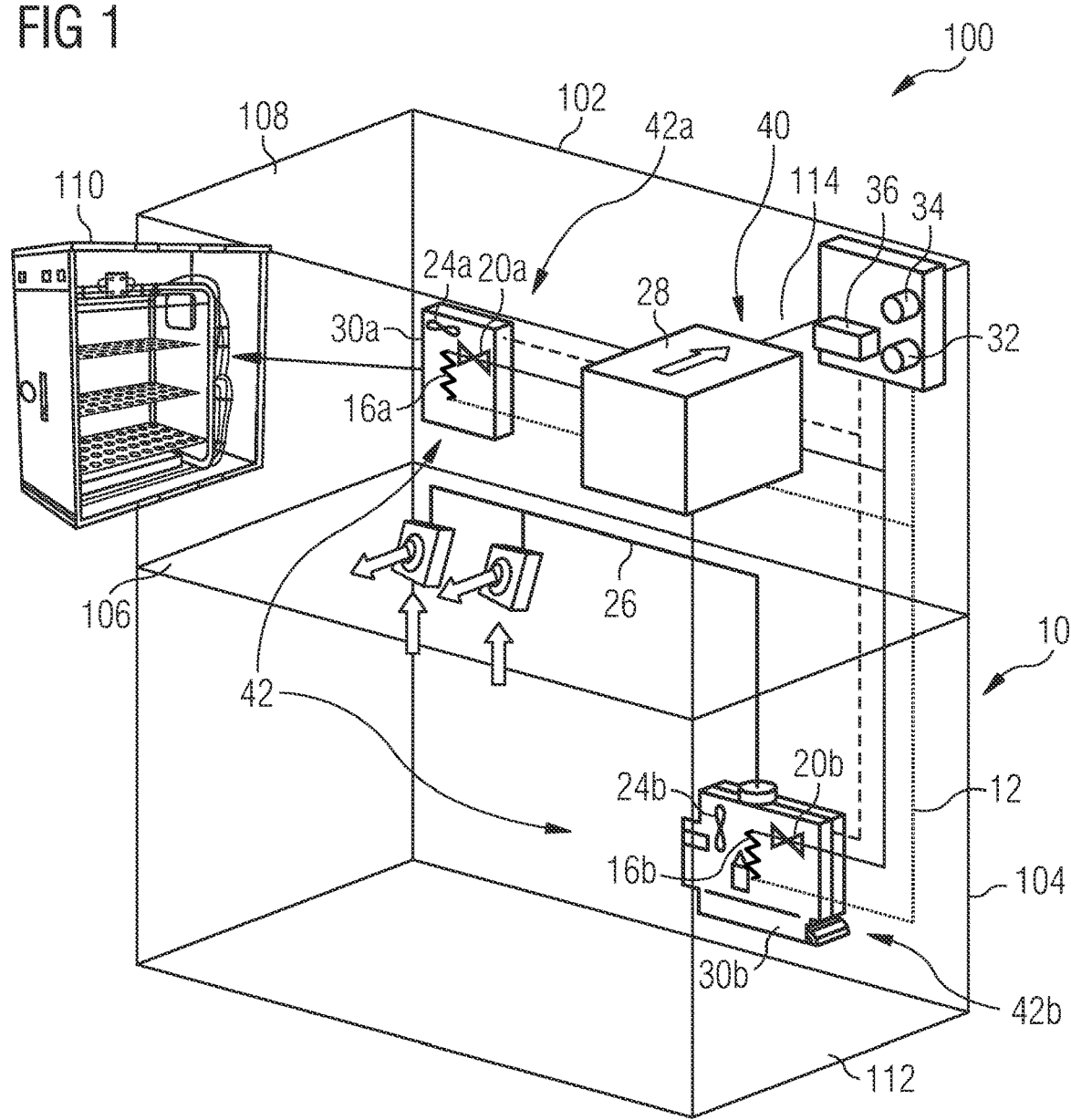
FIG. 1 shows a schematic view of an aircraft kitchen equipped with a cooling arrangement.

FIG. 1 shows a kitchen 100 which is suitable in particular for installation in a passenger cabin of a passenger aircraft. The kitchen 100 comprises a basic structure 102 containing a substructure 104 and an upper structure 108 which is separated from the substructure 104 by a work top 106. The upper structure 108 contains a plurality of upper compartments 110, in which kitchen equipment, e.g. coffee machines, kettles, etc., and beverages and food, can be accommodated. The detail-specific view in FIG. 1 depicts, by way of example, an upper compartment 110 designed in the form of a wine cooler with no door. The substructure 104 of the kitchen 100, in contrast, contains a trolley compartment 112 for accommodating mobile trolleys which are laden with items, e.g. beverages and food, intended to be given out to the passengers in the passenger cabin of the passenger aircraft.

A cooling system 10 serves to cool the trolley compartment 112 which is arranged in the substructure 104 of the kitchen 100, and the upper compartment 110 which is arranged in the upper structure 108 of the kitchen 100. The cooling arrangement 10 comprises a cooling circuit 12 which has a two-phase coolant flowing through it. The cooling circuit 12 contains a condenser 14, a first evaporator 16a and a second evaporator 16b. As it flows through the evaporators 16a, 16b, the cooling medium flowing through the cooling circuit 12 absorbs heat from a fluid which is to be cooled, and the cooling medium is transferred in the process from the liquid into the gaseous state. In contrast, as it flows through the condenser 14, the cooling medium flowing through the cooling circuit 12 is cooled by virtue of heat energy being dissipated to a heat-absorbing fluid, and it is converted back again from the gaseous into the liquid state.

A compressor 18 is arranged in the cooling circuit 12, upstream of the condenser 14. Furthermore, each evaporator 16a, 16b is assigned a control valve 20a, 20b which is designed in the form of an expansion valve, is arranged in the cooling circuit 12 upstream of the respective evaporator 16a, 16b and is intended to control the volume flow of cooling medium through the cooling circuit 12 in the direction of the evaporator 16a, 16b and, as a result, the cooling capacity of the evaporator 16a, 16b.

The condenser 14 comprises a heat exchanger, by means of which the compressed cooling medium fed to the condenser 14 by the compressor 18 is brought into thermal contact with a first heat-absorbing fluid, in this case air. For the purpose of delivering the first fluid through the condenser 14, the condenser is assigned a first delivery device 22 which is designed in the form of a fan. Similarly, each of the evaporators 16a, 16b comprises a heat exchanger, by means of which a second fluid which is to be cooled, in this case air, is brought into thermal contact with the cooling medium flowing through the cooling circuit 12. For the purpose of delivering the second fluid through the evaporators 16a, 16b each evaporator 16a, 16b is assigned a second delivery device 24a, 24b which is designed in the form of a fan.

The first evaporator 16a serves to cool air which is delivered by the second delivery device 24a which is assigned to the first evaporator 16a, through the first evaporator 16a and then into the upper compartment 110 which is designed in the form of a wine cooler. In contrast, the second evaporator 16b is provided to cool air which is delivered by the second delivery device 24b which is assigned to the second evaporator 16b, through the second evaporator 16b and then through a cooling-air-feed channel 26, and corresponding cooling-air-outlet openings 28, into the trolley compartment 112.

If desired, it is possible for cooling air which is heated as it flows through the upper compartment 110 and/or the trolley compartment 112 to be recirculated in the direction of the condenser 14 and delivered, in the form of the first heat-absorbing fluid, through the condenser 14 by the first delivery device 22. As an alternative, however, it is also conceivable for the cooling air which is heated as it flows through the upper compartment 110 and/or the trolley compartment 112 to be dissipated into the surroundings of the kitchen 100. The air which is to be directed through the condenser 14 in the form of the first heat-absorbing fluid can then be removed directly from the surroundings of the kitchen 100 or from some other source.

Finally, the cooling arrangement 10 comprises a control unit 27 which controls the operation of the cooling arrangement 10. The control unit 27 is intended to receive signals which are characteristic of the operating state of the cooling arrangement 10 and of the cooling requirements of the upper compartment 110 and of the trolley compartment 112, and to control the cooling capacities of the evaporators 16a, 16b in dependence on these signals. In particular, the control unit 27 is intended to control, by appropriate control of the valves 20a, 20b, the volume flow of cooling medium to the evaporators 16a, 16b and thus the cooling capacities of the evaporators 16a, 16b independently of one another. It is thus possible to determine different target temperatures for the upper compartment 110 and the trolley compartment 112. It is also possible to react to different cooling requirements of the upper compartment 110 and of the trolley compartment 112.

Figure 2:
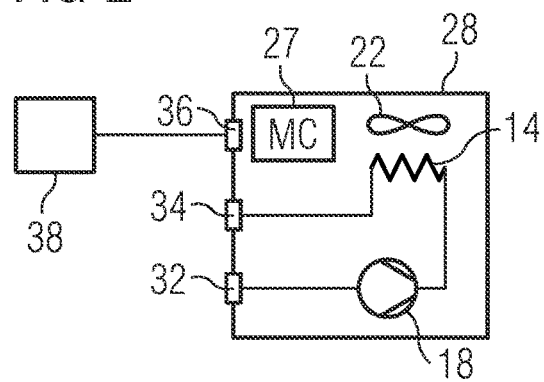
FIG. 2 shows a cross-sectional view of a condenser housing of the cooling arrangement.

As can be seen, in particular, from FIG. 2, the condenser 14 is accommodated in a condenser housing 28 separately from the evaporators 16a, 16b. Alongside the condenser 14, the condenser housing 18 also accommodates the compressor 18, the first delivery device 22 and the control unit 27. Each of the evaporators 16a, 16b is provided with an evaporator housing 30a, 30b which is formed separately from the condenser housing 28 and which, alongside the respective evaporator 16a, 16b, also contains the second delivery device 24a, 24b which is assigned to the evaporator 16a, 16b, and the expansion valve 20a, 20b which is assigned to the evaporator 16a, 16b.

Two cooling-circuit connections 32, 34, by means of which the condenser 14 accommodated in the condenser housing 28 is connected to the cooling circuit 12 of the cooling arrangement 10, provided in the region of a rear outer surface of the condenser housing 28. By means of a condenser feed-line connection 32, the cooling medium is heated as it flows through the evaporators 16a, 16b is fed to the condenser 14 and, by means of a condenser discharging-line connection 34, the cooling medium cooled as it flows through the condenser 14 is discharged from the condenser 14 in the direction of the evaporators 16a, 16b.

It is also the case that an electrical connection 36, by means of which the control unit 27 accommodated in the condenser housing 28 is connected to an electrical network 38 which is depicted merely schematically in FIG. 2, is arranged in the region of the rear outer surface of the condenser housing 28. The electrical network 38 serves to supply the control unit 27 with electrical energy. It is also the case that the control unit 27 is fed input signals, for example signals which are characteristic of the operating state of the cooling arrangement 10 and/or of the cooling requirements of the upper compartment 110 and of the trolley compartment 112, via the electrical network 38. Furthermore, control signals can be emitted to the control unit 27 via the electrical connection 36 and fed, for example, to the valves 20a, 20b and/or the delivery devices 24a, 24b via the electrical network 38. Of course, the control unit 27 can also emit control signals to the first delivery device 22 which is arranged together with the control unit 27 in the condenser housing 28.

The condenser housing 28 is arranged in a first installation space 40 which forms a first sub-region of the kitchen 100. In the exemplary embodiment of a kitchen 100 which is shown in FIG. 1, the first installation space 40 forms a rear region of a standard, non-cooled kitchen compartment 114 which is provided above the work top 106. In contrast, the evaporator housings 30a, 30b which accommodate the evaporators 16a, 16b, are arranged in a second installation space 42 which is separated spatially from the first installation space 40 and forms a second sub-region of the kitchen 100. The second installation space 42 is subdivided into a first installation sub-space 42a and a second installation sub-space 42b which is separated spatially from the first installation sub-space 42a.

In particular, in the case of the kitchen 100 which is depicted in FIG. 1, the first installation sub-space 42a is located in a position directly adjacent to a rear wall of the upper compartment 110 which is to be cooled. As an alternative, however, it would also be conceivable to integrate the second installation sub-space 42a in the upper compartment 110, in which case the first installation sub-space 42a forms a sub-region of the upper compartment 110 and the evaporator housing 30a which accommodates the first evaporator 16a, is accommodated in the upper compartment 110. In contrast, the second installation sub-space 42b forms a sub-region of the trolley compartment 112, i.e. the evaporator housing 30b which accommodates the second evaporator 16b, is integrated in the trolley compartment 112 in a position adjacent to a rear wall of the trolley compartment 112.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A kitchen configured for installation in an aircraft comprising a cooling arrangement, wherein the cooling arrangement comprises a cooling circuit configured to have a cooling medium flowing through the cooling circuit and in which a condenser and a plurality of evaporators are arranged, comprising:

the condenser being accommodated in a condenser housing and being arranged in a first installation space which is configured to form a first sub-region of the kitchen, each of the plurality of evaporators being accommodated in a respective evaporator housing formed separately from the condenser housing, and being arranged in a second installation space which is configured to form a second sub-region of the kitchen, a compressor, a first delivery device, which is configured to deliver through the condenser a first fluid, which is configured to absorb heat from the cooling medium flowing through the condenser, wherein the first delivery device is a fan or a pump, a plurality of second delivery devices configured to deliver through each of the plurality of evaporators a second fluid, which is configured to dissipate heat to the cooling medium flowing through each of the plurality of evaporators, wherein each second delivery device of the plurality of second delivery devices is a fan or a pump, wherein each second delivery device of the plurality of second delivery devices is arranged in the respective evaporator housing, wherein the first installation space of the cooling arrangement is arranged wholly below a top of the kitchen and forms a rear region of a kitchen compartment arranged above a work top of the kitchen, wherein the kitchen is separated into an upper structure and a lower substructure which are separated by the work top, wherein the condenser housing and at least one of the plurality of evaporators within the respective evaporator housing are located wholly within the upper structure, wherein at least one of the plurality of evaporators within the respective evaporator housing is located wholly within the lower substructure, and wherein the kitchen further comprises both:

a coolable trolley compartment, which is to be cooled and is arranged beneath the work top of the kitchen, wherein the second installation space of the cooling arrangement is arranged in a position adjacent to the coolable trolley compartment or is integrated in the coolable trolley compartment, and a coolable kitchen compartment, which is to be cooled and is arranged above the work top of the kitchen, wherein the second installation space of the cooling arrangement is arranged in a position adjacent to the coolable kitchen compartment or is integrated in the coolable kitchen compartment.

2. The cooling arrangement according to claim 1, further comprising:

a valve which is configured as an expansion valve configured to control a volume flow of the cooling medium through the cooling circuit of the cooling arrangement.

3. The cooling arrangement according to claim 1, wherein at least one of the compressor or the first delivery device is arranged in the condenser housing.

4. The cooling arrangement according to claim 2, wherein the valve is arranged in the respective evaporator housing of the plurality of evaporators.

5. The cooling arrangement according to claim 1, wherein an expansion valve is arranged upstream of each of the plurality of evaporators to control a volume flow of the cooling medium to a respective evaporator of the plurality of evaporators.

6. The cooling arrangement according to claim 5, wherein the second installation space is subdivided into a plurality of second installation sub-spaces which are each formed separately from one another and are each configured to accommodate at least one evaporator of the plurality of evaporators.

7. The cooling arrangement according to claim 1, further comprising a controller to control operation of the cooling arrangement, wherein the controller is arranged in the condenser housing.

8. The cooling arrangement according to claim 5, further comprising a controller to control operation of the cooling arrangement, wherein the controller is arranged in the condenser housing and wherein the controller is configured to control cooling capacities of each evaporator in the plurality of evaporators independently of one another.

9. The cooling arrangement according to claim 7, further comprising, arranged in a region of an outer surface of the condenser housing, at least one of:

one cooling-circuit connection is arranged in the region of the outer surface of the condenser housing, by which the condenser accommodated in the condenser housing is connected to the cooling circuit of the cooling arrangement, or an electrical connection is arranged in the region of the outer surface of the condenser housing, by which the controller accommodated in the condenser housing is connected to an electrical network.

10. A kitchen configured for installation in an aircraft comprising a cooling arrangement, wherein the cooling arrangement comprises a cooling circuit configured to have a cooling medium flowing through the cooling circuit and in which a condenser and a plurality of evaporators are arranged, comprising the condenser being accommodated in a condenser housing and being arranged in a first installation space which is configured to form a first sub-region of the kitchen, each of the plurality of evaporators being accommodated in a respective evaporator housing formed separately from the condenser housing, and being arranged in a second installation space which is configured to form a second sub-region of the kitchen, a compressor, a first delivery device, which is configured to deliver through the condenser a first fluid, which is configured to absorb heat from the cooling medium flowing through the condenser, wherein the first delivery device is a fan or a pump, a plurality of second delivery devices configured to deliver through each of the plurality of evaporators a second fluid, which is configured to dissipate heat to the cooling medium flowing through each of the plurality of evaporators, wherein each second delivery device of the plurality of second delivery devices is a fan or a pump, wherein each second delivery device of the plurality of second delivery devices is arranged in the respective evaporator housing, wherein the first installation space of the cooling arrangement is arranged wholly below a top of the kitchen and forms a rear region of a kitchen compartment arranged above a work top of the kitchen, wherein the kitchen is separated into an upper structure and a lower substructure which are separated by the work top, wherein the condenser housing and at least one of the plurality of evaporators within the respective evaporator housing are located wholly within the upper structure, wherein at least one of the plurality of evaporators within the respective evaporator housing is located wholly within the lower substructure, and wherein the kitchen further comprises:

a coolable kitchen compartment, which is to be cooled and is arranged above the work top of the kitchen, wherein the second installation space of the cooling arrangement is arranged in a position adjacent to the coolable kitchen compartment or is integrated in the coolable kitchen compartment.

11. A kitchen configured for installation in an aircraft comprising a cooling arrangement, wherein the cooling arrangement comprises a cooling circuit configured to have a cooling medium flowing through the cooling circuit and in which a condenser and a plurality of evaporators are arranged, comprising the condenser being accommodated in a condenser housing and being arranged in a first installation space which is configured to form a first sub-region of the kitchen, each of the plurality of evaporators being accommodated in a respective evaporator housing formed separately from the condenser housing, and being arranged in a second installation space which is configured to form a second sub-region of the kitchen, a compressor, a first delivery device, which is configured to deliver through the condenser a first fluid, which is configured to absorb heat from the cooling medium flowing through the condenser, wherein the first delivery device is a fan or a pump, a plurality of second delivery devices configured to deliver through each of the plurality of evaporators a second fluid to dissipate heat to the cooling medium flowing through the evaporator, wherein each second delivery device of the plurality of second delivery devices is a fan or a pump, wherein each second delivery device of the plurality of second delivery devices is arranged in the respective evaporator housing, wherein the first installation space of the cooling arrangement is arranged wholly below a top of the kitchen and forms a rear region of a kitchen compai linent arranged above a work top of the kitchen, wherein the kitchen is separated into an upper structure and a lower substructure which are separated by the work top, wherein the condenser housing and at least one of the plurality of evaporators within the respective evaporator housing are located wholly within the upper structure, wherein at least one of the plurality of evaporators within the respective evaporator housing is located wholly within the lower substructure, and wherein the kitchen further comprises a coolable trolley compartment, which is to be cooled and is arranged beneath the work top of the kitchen, wherein the second installation space of the cooling arrangement is arranged in a position adjacent to the coolable trolley compartment or is integrated in the coolable trolley compartment.

12. The cooling arrangement according to claim 10, wherein an expansion valve is arranged upstream of each of the plurality of evaporators to control a volume flow of the cooling medium to the each of the plurality of evaporators.

13. The cooling arrangement according to claim 11, wherein an expansion valve is arranged upstream of each of the plurality of evaporators to control a volume flow of the cooling medium to each of the plurality of evaporators.

* * * * *